(12) United States Patent
Ross et al.

(10) Patent No.: US 6,481,383 B1
(45) Date of Patent: Nov. 19, 2002

(54) GARMENT FOR MINIMIZING THE DISTRIBUTION OF DOMESTIC PET HAIR

(76) Inventors: Susan E. Ross, 109 Front Street P.O. Box 52, Bobcaygeon, Ontario (CA), K0M 1A0; Eileen McGee, 109 Front Street P.O. Box 52, Bobcaygeon, Ontario (CA), K0M 1A0

( * ) Notice: Subject to any disclaimer, the term of this patent is extended or adjusted under 35 U.S.C. 154(b) by 0 days.

(21) Appl. No.: 09/662,753

(22) Filed: Sep. 15, 2000

(30) Foreign Application Priority Data

Sep. 16, 1999 (CA) .............................................. 2282216

(51) Int. Cl.[7] .............................................. A01K 29/00
(52) U.S. Cl. ........................... 119/850; 2/456; D30/145
(58) Field of Search ................................ 119/850, 853, 119/854, 809, 810, 811, 868; D30/145; 54/78, 79.1, 79.2; 2/456, 462, 463, 69, 92, 93, 102

(56) References Cited

U.S. PATENT DOCUMENTS

| | | | | |
|---|---|---|---|---|
| D114,976 S | * | 5/1939 | Laczko ........................ D30/145 |
| 2,417,803 A | * | 3/1947 | De Mar ....................... 119/850 |
| 3,742,679 A | * | 7/1973 | Jordan ......................... 54/79.1 |
| 3,918,238 A | | 11/1975 | Iozzio | |
| 4,103,645 A | * | 8/1978 | Tyler ........................... 119/868 |
| 4,355,600 A | * | 10/1982 | Zielinski ...................... 119/850 |
| 4,577,591 A | | 3/1986 | Wesseldine | |
| 4,744,333 A | * | 5/1988 | Taylor ......................... 119/850 |
| 5,060,458 A | | 10/1991 | Curtis | |
| 5,146,874 A | * | 9/1992 | Vidal .......................... 119/868 |
| 5,341,765 A | * | 8/1994 | McComb ..................... 119/850 |
| D352,370 S | * | 11/1994 | Shover ....................... D30/145 |
| 5,359,963 A | * | 11/1994 | Jesse, Jr. et al. ............ 119/850 |
| D374,315 S | * | 10/1996 | Caditz ........................ D30/145 |
| 5,676,094 A | * | 10/1997 | Gun-Munro ................. 119/850 |
| 5,937,795 A | * | 8/1999 | Raphael ...................... 119/869 |
| D427,734 S | * | 7/2000 | Balzarini .................... D30/145 |
| 6,089,194 A | | 7/2000 | LaBelle | |
| 6,138,611 A | * | 10/2000 | Thielemann ................. 119/850 |
| 6,163,891 A | * | 12/2000 | Viitalahti ....................... 2/422 |
| D441,924 S | * | 5/2001 | Mann ........................ D30/145 |
| 6,223,696 B1 | * | 5/2001 | Murakami ................... 119/850 |
| D444,923 S | * | 7/2001 | Dzamon et al. ........... D30/145 |

* cited by examiner

Primary Examiner—Yvonne R. Abbott
(74) Attorney, Agent, or Firm—Ridout & Maybee LLP

(57) ABSTRACT

A garment for pets, designed for minimizing the distribution of hair from the pet while maximizing comfort for the pet. The garment is lightweight and, in particular, allows air to flow through unimpeded. The garment has a body panel and fasteners for fastening said body panel onto the back, sides and breast of a pet, and, in particular, the body panel is a mesh fabric.

9 Claims, 3 Drawing Sheets

GARMENT FOR MINIMIZING THE DISTRIBUTION OF DOMESTIC PET HAIR

CROSS REFERENCE

This application claims priority from Canadian Patent Application Serial No. 2,282,216, filed Sep. 16, 1999.

FIELD OF THE INVENTION

This invention relates to a garment for minimizing the distribution of domestic pet hair.

BACKGROUND OF THE INVENTION

Pet hair in a domestic environment may cause excessive housework and stress and, more importantly, may cause allergic reactions in some people. In any home where there is a domestic pet which sheds hair, the homemaker is constantly working to eliminate pet hair from the furniture and rugs. In some instances the problem has been so acute that it has been necessary to get rid of the pet in question. Alternatively, some people have found it necessary to confine themselves to non-shedding pets.

It would be useful if there was some means of preventing dogs and cats from shedding hair all over the furniture and all over the house without impeding the pets activities in any way. Attempts to utilize a blanket or body sock intended for outdoor protection of the pet during the winter have proved unsuccessful. Dog blankets modeled on the style of a horse blanket, with the chest and underbody of the dog uncovered, are not successful. Not only is it possible for considerable shedding from the chest and underbody, but also the blankets are too hot for indoor use and are too heavy for the dogs to have free, unrestricted movement in sleeping and playing. The body socks, which are frequently of knitted construction having an elastic collar and sleeves for the front legs are also too hot and, because the knitted construction is generally quite tight, constricting. Many dogs are uncomfortable in blankets or body socks even when it is cold outside.

The closest prior art patent of which the applicant is aware is U.S. Pat. No. 6,089,194, which discloses a heat reflecting all-weather pet garment. This patent discloses a garment meant to protect the pet from weather extremes, by reflecting heat back onto or away from the pet. U.S. Pat. No. 3,918,238 discloses a rain jacket for dogs. This patent teaches the use of a jacket and hood for a dog which is composed of a waterproof material and secured by tie straps. U.S. Pat. No. 4,577,591, entitled "Incontinence and Protective Device for Animals", shows the use of hook and loop attachments for a dog garment. U.S. Pat. No. 5,060,458, entitled "Protective Dog Coat", shows the use of a two-ply protective rain coat which is attached by hook and loop fastening means.

None of these prior art references, however, teach or suggest a garment which will not trap heat within the garment. None of these prior art references teach or suggest a garment which will allow the pet a level of comfort and freedom of movement which is comparable with not wearing a garment. There is therefore a need in the art for a garment that will address this, while preventing the spreading of shed hair.

SUMMARY OF THE INVENTION

The present inventors have devised a lightweight garment acceptable to the pet, for example, a dog or a cat, which garment may prevent shed hair being distributed around the house.

In one embodiment, the invention teaches a lightweight, flexible pet garment for minimizing the distribution of pet hair, comprising: a body panel having a front and a rear portion; a collar located proximal to the front, the collar defining a neck aperture through the body panel; a breast panel extending from the collar to a panel end; arms extending distal from the panel end, the arms extending to arm termini; arm fasteners located at the arm termini; rear fasteners located at distal ends of the rear portion; wherein, in use, the body panel is placed on the trunk of a pet, the pet's neck extends through the collar, the breast panel extends between the pet's forelegs rearward, the arms wrap around the pet's trunk, the arm fasteners secure the arm termini together at the pet's trunk, and the rear fasteners secure the distal rear portions at the pet's rear legs.

Another embodiment teaches rear fasteners that include elasticized straps. A further embodiment teaches gussets located at distal ends of the front. A further embodiment teaches rear fasteners that include elasticized edging at distal ends of the rear portion.

In another embodiment the invention includes leg covers and leg cover fasteners located at distal ends of the front and the rear portion. In another embodiment the invention includes a tail cover and a tail cover fastener at the rear portion. In another embodiment the invention includes an elasticized section on at least one of the arms. The collar may be elasticized.

In an embodiment, the body panel is a mesh fabric.

The invention also teaches a lightweight, flexible pet garment for minimizing the distribution of pet hair, comprising a body panel and fasteners for fastening the body panel onto the back, sides and breast of a pet, wherein the body panel is a mesh fabric.

The mesh size may be between 1 mm and 10 mm in diameter. The mesh size may be 3 mm in diameter.

In another embodiment the mesh fabric has round holes. The mesh fabric may be a polyester fabric. The polyester fabric may have an acrylic resin finish. The mesh fabric may have a weight of about 2.2 ounces per square yard. The mesh fabric may have a tensile strength of at least 50 lb warp and at least 67.5 lb weft.

BRIEF DESCRIPTION OF THE DRAWINGS

An embodiment of the invention will now be described with reference to the drawings in which.

DETAILED DESCRIPTION OF THE PREFERRED EMBODIMENT

A garment to minimize distribution of shed pet hair is formed from lightweight, flexible, meshed fabric. A body panel extending rearwardly from a stretchable collar is shaped to cover the back and sides of the pet. A chest protecting and closure panel also extends from the stretchable collar in the form of a T. The leg of the T merges with the front portion of the body panel and extends rearwardly between the front legs of the pet to the arms of the T. The arms of the T wrap around the body of the dog and have means to fasten their distal ends together so that they extend around the rib cage of the pet. A pair of leg straps may be provided to cling loosely around the rear legs of the pet to hold the body part in position over the dog's rump.

The stretchable collar should stretch so that it may easily be passed over the dog's head in fitting the garment but should have sufficient elasticity to fit around the neck sufficiently closely that shed hair will not easily emerge from the neck of the garment when being worn by the pet. Means may be provided on the body panel for the attachment of optional additional parts such as a tail protector and protective sleeves for the front and/or rear legs.

The mesh of the fabric is small enough to catch shed pet hair and to retain it but large enough to allow free air passage into the pet's fur so that there is little or no heating effect. Thus, the air circulates about the pet under the garment almost as if the garment were not present. Square, round or other shape of mesh may be used. Generally a mesh size of ⅛"×⅛" (3 mm×3 mm) is suitable but larger and smaller mesh is possible. It is believed that larger mesh up to at least ¼"×¼" (6 mm×6 mm) may be suitable.

Figure 1:
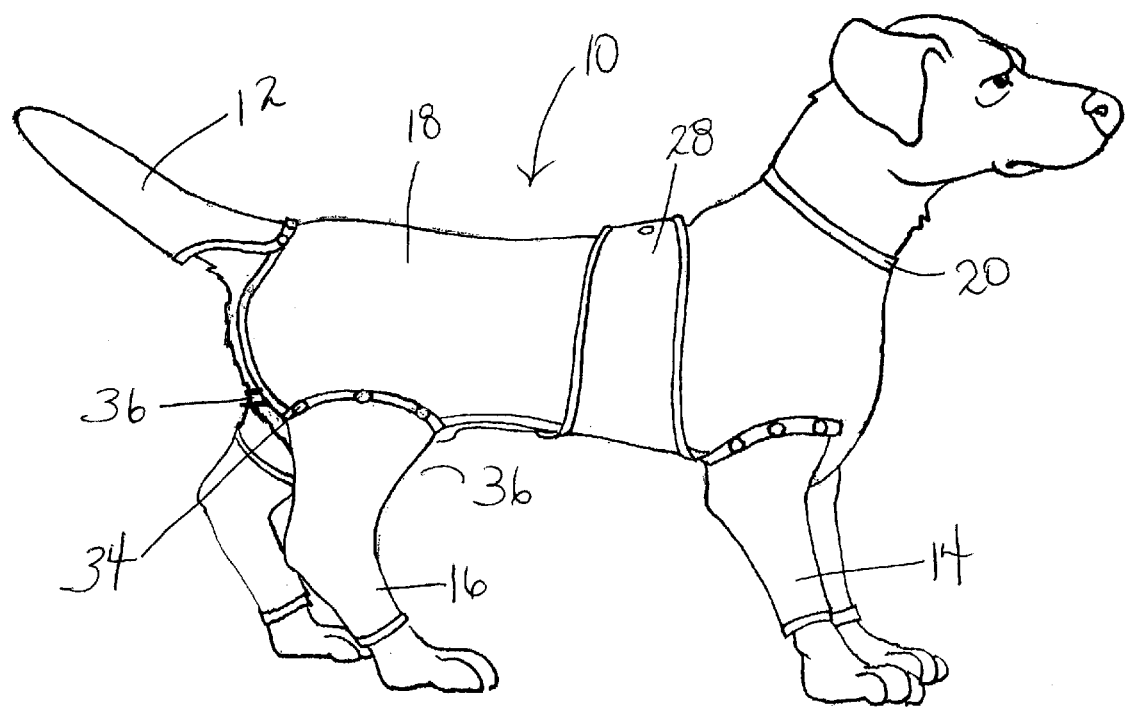
FIG. 1 is a sketch of a dog wearing a garment according to the invention.

FIG. 1 shows a dog wearing a garment 10 according to the invention formed of mesh fabric. The garment is equipped with optional accessories including a tail protector 12 and a front leg protector 14 and rear leg protector 16. The front and rear leg protectors 14, 16 are shown for one front leg and one rear leg only to emphasize that these accessories are optional. They may be desirable for dogs having a tail and legs which are heavily feathered such as Pekinese, Lhasa Apso, or a Highland Terrier and larger breeds such as collies.

Figure 2:
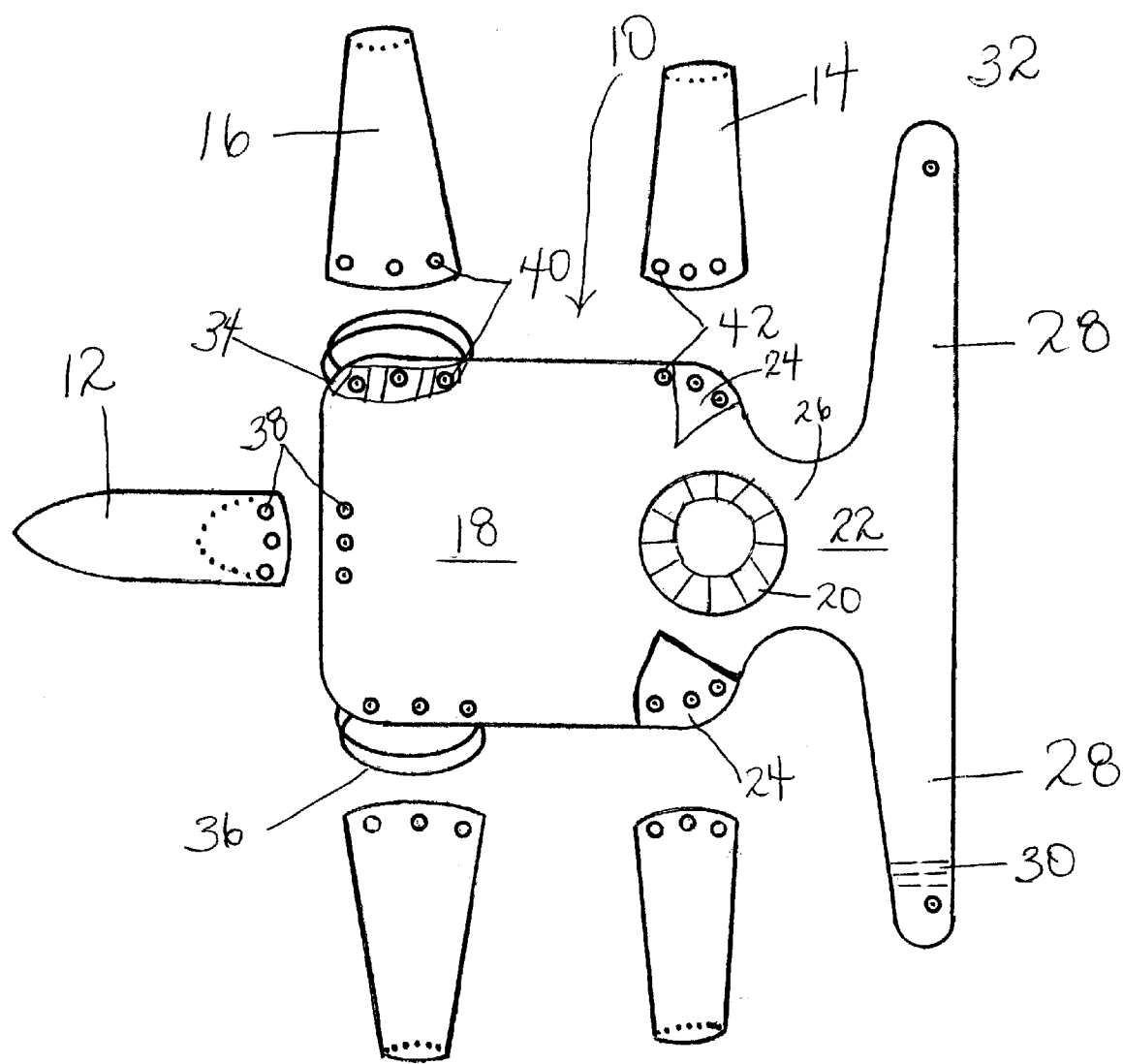
FIG. 2 shows the garment in plan.

FIG. 2 shows the garment 10 of FIG. 1 laid out as flat as possible in order to see the component parts.

The garment 10 comprises a body panel 18 extending rearwardly from a stretchable collar 20 and joined to a chest protector and closure panel 22 through gussets 24 which can be used to help to shape the body panel 18 so that it is formed to cover the back and sides of the dog.

The chest protector panel 22 is formed in the shape of a T, the leg 26 of which blends into the body panel 12 through gussets 24. The arms 28 of the T of panel 22 wrap around the rib cage of the dog and fasten around the body panel 18 to help hold it in position. One or both arms 28 of the T may have an elasticized section 30 so that the wrapping around the body panel may fit the dog closely without constriction. It follows from the requirements that the elasticized section 30 should not make the closure too tight for comfort.

As used herein, "elasticized" refers to either an elastic material or a material with an elastic material associated with it, for example, by sewing an elastic into the material.

The arms 28 of the T may be connected together in any convenient manner, for example through snap fasteners, buttons and button holes, hooks and eyes, or any convenient means, including hook and loop fastening such as Velcro™.

A rear section 34 on each side of the body panel is elasticized to cause gathering in this region so that the body panel lies as closely against the rear leg of a dog wearing the garment. At each end of each elasticized section elasticized straps 36 may be attached to lie inside the rear leg of the dog and to hold the elasticized section 34 closely against it.

The stretchable collar 20 may be made of a ribbed knit material having sufficient stretch to pass easily over the head of the dog but to lie closely against its neck. Such knit collar may alternatively be replaced by an elasticized section around a neck hole in the merged back panel and chest protection panel.

It should be noted that the present design is particularly desirable in its simplicity. The body panel is a one piece garment which can cover the entire trunk and breast of a pet.

Fastening means may be provided at appropriate points along an edge or margin of the body panel 18 for attachment of optional accessories. For example, snap fasteners 38 or other fastening means may be provided on a rear edge of back panel 18 for the attachment of tail protector 12. Snap fasteners 40 may be provided along elasticized section 34 for attachment of a rear leg protector 16 and snap fasteners 42 or other fastening means may be provided at a front section of back panel 18 and on gusset 24 for attachment of a front leg protector 14.

Tail protector 12 may be formed to cover the whole length of the top of the tail but only part of the length of the underside of the tail. On the underside of the tail a part of the tail is left clear to reduce the risk of the dog soiling the tail protector when defecating.

The rear leg protector 16 may be tubular and may be of the same length over its perimeter but it may have a cut away section on the inside at the top to minimize the risk of soiling by a male dog when urinating.

Generally the front leg protectors 14 will be tubular without any cut away sections.

It is to be emphasized that while means of attachment for the tail protector, the front and rear leg protectors should be provided on the main garment, the use of such accessory protectors is optional.

The fabric from which the garment 10 and any accessories is made should be lightweight mesh fabric for unimpeded air flow about the pet. The fabric may be any open mesh which is small enough to trap hair and large enough for airflow. For example, the mesh size may be ⅛"×⅛" (3 mm×3 mm). Preferably, the holes should be between 1 millimetre and 10 millimetres in diameter and most preferably 3 millimetres in diameter. The matrix nature of the fabric is particularly beneficial, as it tends to trap hair from the pet within the matrix, by entanglement.

Figure 3:
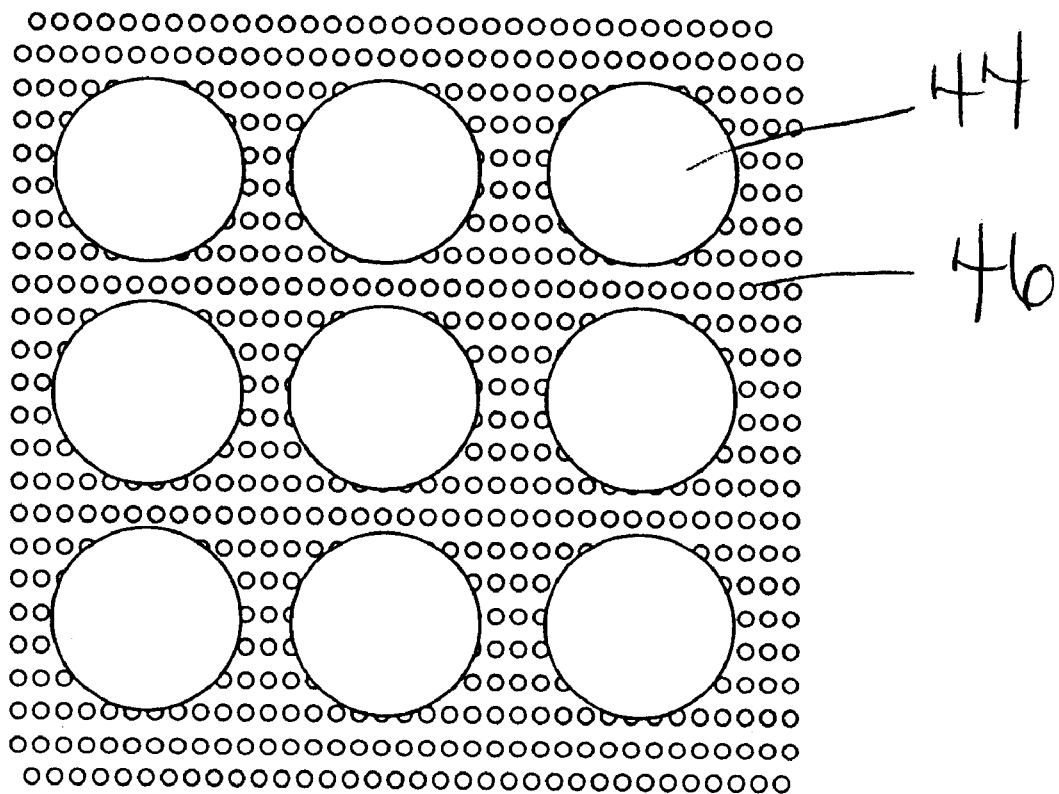
FIG. 3 shows one type of suitable mesh.

FIG. 3 shows one particular mesh having round holes 44 about 3 millimetres (⅛") in diameter in a woven matrix 46. Matrix 46 is, itself, meshed with smaller holes. The fabric may be polyester fabric having an acrylic resin finish and a weight of about 2.2 ounces per square yard. The fabric may have a tensile strength of 50 lb warp, or greater, and 67.5 lb weft, or greater, for durability of wear.

Although preferred embodiments of the invention have been disclosed for illustrative purposes, it will be appreciated that variations or modifications of the disclosed apparatus lie within the scope of the present embodiments.

We claim:

1. A lightweight, flexible pet garment for minimizing the distribution of pet hair, comprising:
   a body panel having a front and a rear portion;
   a collar located proximal to said front, said collar defining a neck aperture through said body panel;
   a breast panel extending from said collar to a panel end; arms extending distal from said panel end, said arms extending to arm termini;
   arm fasteners located at said arm termini;
   rear fasteners located at distal ends of said rear portion;
   wherein, in use, said body panel is placed on the trunk of a pet, the pet's neck extends through said collar, said breast panel extends between the pet's forelegs rearward, said arms wrap around the pet's trunk, said arm fasteners secure said arm termini together at the pet's trunk, and said rear fasteners secure said distal rear portions at the pet's rear legs.

2. A pet garment as claimed in claim 1, wherein said rear fasteners include elasticized straps.

3. A pet garment as claimed in claim 1, further comprising gussets located at distal ends of said front.

4. A pet garment as claimed in claim 1, wherein said rear fasteners include elasticized edging at distal ends of said rear portion.

5. A pet garment as claimed in claim 1, further comprising leg covers and leg cover fasteners located at distal ends of said front and said rear portion.

6. A pet garment as claimed in claim 1, further comprising a tail cover and a tail cover fastener at said rear portion.

7. A pet garment as claimed in claim 1, further comprising an elasticized section on at least one of said arms.

8. A pet garment as claimed in claim 1, wherein said collar is elasticized.

9. A pet garment as claimed in claim 1, wherein said body panel is a mesh fabric.

* * * * *